Figure 1:
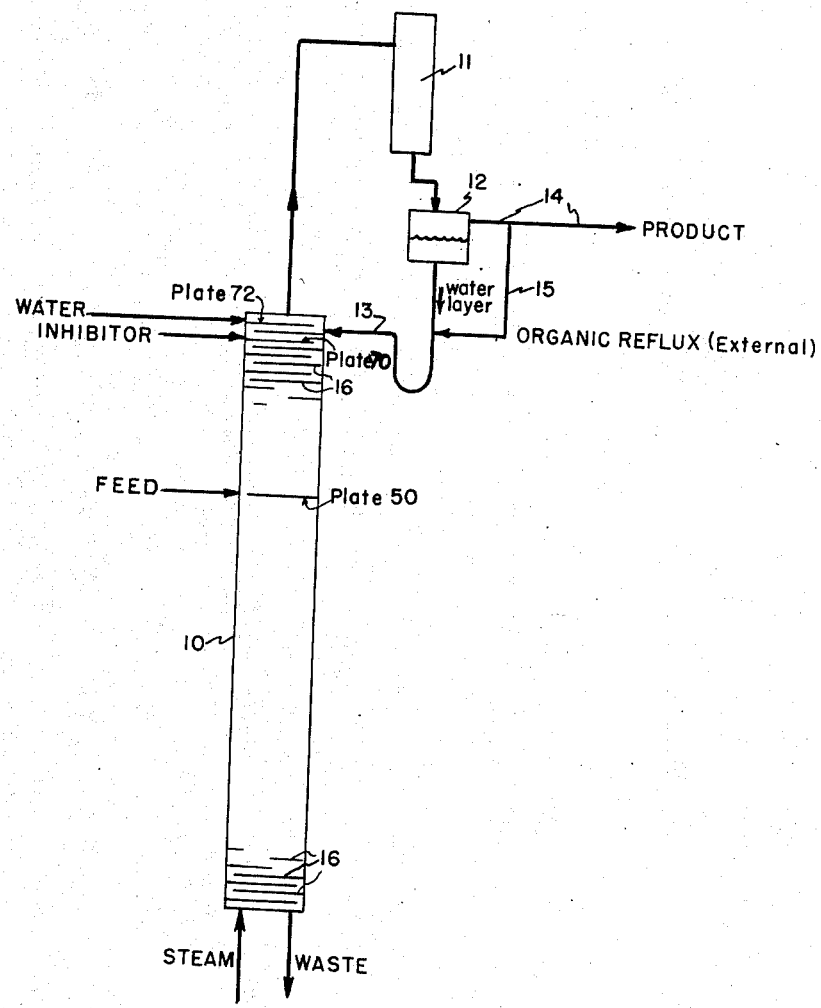

Patented June 15, 1954

2,681,306

UNITED STATES PATENT OFFICE 2,681,306

PURIFICATION OF ACRYLONITRILE BY EXTRACTIVE DISTILLATION

Harold S. Kemp, Wilmington, Cyrus Pyle, New Castle, and Gilbert M. Turner, Wilmington, Del., assignors to E. I. du Pont de Nemours & Company, Wilmington, Del., a corporation of Delaware Application February 6, 1952, Serial No. 270,212

12 Claims. (Cl. 202—39.5)

This invention relates to the purification of acrylonitrile and more particularly to the purification of acrylonitrile that has passed through a polymerization step wherein the original impurities have become more concentrated and wherein by-product impurities have been formed.

In continuous polymerization of acrylonitrile about 65% to 80% of the acrylonitrile fed to the polymerizer is converted to the polymer, and the monomer recovered even after one pass through the polymerizer contains much higher concentrations of impurities than before. Additionally, the polymerization reaction has introduced a very substantial amount of by-product impurity. Reuse of this recovered monomer to produce high quality polymer is contingent on the reduction of the impurities to about the level of the starting monomer. For comparison, the amount of impurities in typical new acrylonitrile monomer and the amount of acrylonitrile monomer recovered after one pass through the polymerizer are set forth below:

TABLE I

| Impurity | New, percent | Recovered, percent |
|---|---|---|
| Acetonitrile | 0.05 | 0.2 |
| Acetone | 0.06 | 0.3 |
| Isopropanol | 0.03 | 0.1 |
| Propionitrile | | 0.6 |

Should the monomer be used over and over again without benefit of purification, the total concentration of impurities would reach a level many times higher.

The aqueous solution collected from the filter following continuous polymerization contains from 1% to 2% acrylonitrile and preferably this is concentrated and freed of catalyst and activator before the purification steps of this invention are applied. This is done in a stripper column and to minimize polymerization it is operated to give minimum concentration of acrylonitrile within the column. Condensation of vapors taken from the top of the column followed by decantation and return to the column of the water phase is very effective in concentrating the acrylonitrile. However, practically all of volatile impurities in the stream are recovered with the acrylonitrile. This recovered acrylonitrile product generally contains between 95% and 96% of acrylonitrile, about 3% water, and the amounts of impurities listed above providing but one pass through the polymerizer was made. To remove the several impurities from the acrylonitrile by a single pass through a fractionating column by normal distillation procedures is out of the question for the normal boiling point of acrylonitrile is about 77° C. which is below that of acetonitrile (B. P. 82° C.), isopropanol (B. P. 82° C.), and propionitrile (B. P. 97° C.) but is very substantially above the normal boiling point of acetone which is about 56° C.

It is therefore an object of this invention to provide a water extractive distillation process separating acrylonitrile from a mixture comprised of a normally low boiling, water-miscible compound such as acetone and one or more compounds normally boiling above acrylonitrile such as acetonitrile, propionitrile and/or isopropanol. Other objects will be apparent from the disclosure that follows.

The objects of this invention are accomplished by fractionating an impure acrylonitrile as previously described in the presence of about 95 to 98 mol per cent of water and preferably from 96 to 97.5 mol per cent of water. To carry out this process effectively the fractionating column should have no fewer than 50 plates and preferably, the column should have at least 60 plates. Increasing the number of plates in the column may permit a slight lowering of the mol percentage of water for equivalent operation in efficiency of impurity removal, but in no case can appreciably less than 95 mol per cent of water be used if reasonable removal of the impurity is to be effected even though the number of plates is increased to 100 or even 200. Preferably a column with from 60 to 90 plates is used with the feed introduced at an intermediate point as from ⅝ to ⅞ the way from the bottom to the top; the water solvent is introduced onto or near the top plate as is the external reflux to provide there and on most of the plates in the column at least 95 mol per cent of water; the internal organic reflux ratio, the weight ratio of the liquid downflow to the vapor up-flow, is preferably about 5. If there is any plate above the water feed, the mol percentage of water on that plate tends to be slightly less than 95. This is acceptable providing, of course, the fractionation is done throughout the rest of the column below in the presence of about 95 to 98 mol per cent water. By the process of this invention which employs a large amount of water in the column, acrylonitrile is forced out of the column at the top and other organics, including even materials more volatile than acrylonitrile, such as acetone, are forced out of the column at the bottom.

Figure 1 shows the general layout and flows of a successful operation.

The fractionating column 10 of Figure 1 is a 10″ inside diameter steel column with 72 plates, indicated by reference number 16, mounted on 7″ plate spacings. The feed is introduced onto plate 50 and the water and reflux onto plate 72. At the bottom of the column live steam is injected. The vapor take-off at the top of the column leads to a condenser 11 below which is a decanter 12. The water phase from the decanter is all returned through conduit 13 to the column along with a portion of the organic phase which passes through conduit 15 to maintain a desirable external reflux. Onto plate 70 may be added a suitable polymerization inhibitor if desired. The usual controls, pumps, meters, etc. are provided for maintaining the desired conditions set forth below. The product, chiefly acrylonitrile, is taken off through conduit 14.

*Example I*

To give a calculated 96.8 mol per cent water on the plates while maintaining an internal reflux ratio of 5, the flows were as follows:

Water: 800 lbs. per hr. at 70° C.
Feed*: 16 lbs. per hr. at 30° C.
External organic reflux: About 70 lbs. per hr.
Water phase return from decanter: About 11 lbs. per hr.
Steam: About 115 lbs. per hr.
Inhibitor: (Para nitrosodimethyl aniline to give about 50 parts per million in the organic reflux.)

From 24 analyses for acetone in the reflux over eight days of continuous operation none exceeded 0.05% acetone or over 80% of the acetone introduced was removed from the acrylonitrile product and flushed from the bottom of the column along with other high boiling impurities. A typical analysis of the overhead organic product collected is as follows:

|  | Percent |
|---|---|
| Acrylonitrile | 96.93 |
| Acetone | 0.04 |
| Acetonitrile | 0.02 |
| Isopropanol | 0.00 |
| Propionitrile | 0.01 |
| Water (approx.) | 3.00 |

The temperature profile was controlled by rate of product take-off. The feed rate, steam rate, water rate, and water temperature were held fairly constant. The amount of acrylonitrile per plate was thus approximately constant in the upper part of the column, which operated at acrylonitrile-water pseudo-azeotrope temperatures. A rapid decrease in the amount of acrylonitrile per plate in the base of the tower accompanied a rise in temperature above azeotrope temperature and any excess of takeoff over the acrylonitrile fed resulted in a continual decrease in the amount of acrylonitrile in the column, so that the temperature rise started on successively higher plates. A net decrease in the amount of acrylonitrile in the column caused the azeotrope temperatures to move away from the bottom of the column. Thus, the temperature on some one plate could be held between steam temperature and azeotrope temperature by careful control of take-off.

Samples of bottoms taken under the temperature conditions set forth showed the following concentrations of acrylonitrile.

---

* Feed composition approximately as follows: Acrylonitrile 95.7%, water 3.0%, acetone 0.28%, acetonitrile 0.3%, propionitrile 0.6%, isopropanol 0.1%.

TABLE II

| P. p. m. Acrylonitrile | Temperature readings, °C. | | | |
|---|---|---|---|---|
| | Base | Plate 5 | Plate 9 | Plate 12 |
| 2 | 108 | 108 | 98 | 84 |
| 1,000 | 106 | 80 | 78.5 | 78.5 |

In contrast with the very successful operation described in Example I another test was run with the same equipment wherein the feed rate was about doubled while maintaining the water flow rate the same. Since this required changes in external reflux and steam flow the conditions maintained in this test are tabulated below:

Water: 800 lbs. per hr. at 70° C.
Feed: 33 lbs. per hr. at 30° C.
External organic reflux: About 150 lbs. per hr.
Water phase return from decanter: About 24 lbs. per hr.
Steam: About 126 lbs. per hr.
Inhibitor: Same.

The internal reflux ratio was maintained at 5 and the calculated mol per cent of water was 93.6. Distillate analysis for acetone averaged 0.22%, or from the feed containing 0.28% acetone only about 21% of the acetone was removed.

In a test similar to that described in the last paragraph also at 93.6 mol per cent water where the feed contained higher percentages of impurities, i. e. the acetone content was 0.95%, the distillate averaged 0.82% acetone or only about 14% of the acetone was removed.

*Example II*

By using a feed rate of about 23 lbs. per hr. with a water flow of about 800 lbs. per hr. and reflux and steam flows suitably adjusted, a reasonable removal of acetone is possible with the 72 plate column earlier described. These conditions give a calculated mol per cent of water on the plates of about 95.5 and about 60% of the acetone is removed and discharged with the other impurities in the waste from the bottom of the column. Somewhat better results could be obtained in a column of 100 or more plates and the acetone remaining in the acrylonitrile product might well be brought down to about 0.1% or less. Such a degree of purity is less desirable than obtainable by Example I, but it can be used to produce useful fiber-forming polymer. However, the larger columns are not too feasible and it is therefore generally desirable to maintain the mol per cent of water above about 96.

The water feed is preferably heated to a temperature above room temperature prior to being fed to the column. This temperature may be about 70° C., although lower and higher temperatures can be used. Likewise, the acrylonitrile feed is preferably heated. A temperature of about 30° C., is usually satisfactory, but higher temperatures are operable. Even lower temperatures can be used. The heating medium is usually steam but is not necessarily so. The column may be jacketed and heated by electricity or hot oil, or media other than steam may be introduced at the bottom. Steam is preferred for economy and ease of operation. The inhibitor used can be any of the conventional polymerization inhibitors.

It is indeed surprising that with as much water present as 93.6 mol per cent there is such a poor removal of acetone and yet when this mol percentage of water is increased only a little bit very good removal of impurities is accomplished. While even a mol per cent of water higher than 97 will undoubtedly improve the percentage removal of acetone, the economics of further reducing the rate of feed is not favorable and about 97.5 mol per cent of water on the plates is a practical upper limit although as much as 98 mol per cent of water may be used if desired.

The following table illustrates specific flow rates that may be used effectively with a column having at least 50 plates and with an internal organic reflux ratio equal to 5.

TABLE III

| Calculated Water Concentration on Plates, Mol Percent | 95 | 96 | 96.8 | 97.5 | 98 |
|---|---|---|---|---|---|
| Water Rate, lb. per hr. at 70° C | 800 | 800 | 800 | 800 | 800 |
| Feed Rate, lb. per hr | 25 | 20 | 16 | 12 | 10 |
| External Organic Reflux, lb. per hr., about | 110 | 87 | 70 | 53 | 44 |
| Steam Rate, lb. per hr., about | 131 | 122 | 115 | 108 | 105 |

The ratio of the external organic reflux to the impure acrylonitrile feed may vary from about 3.5 to about 5.3 and is preferably about 4.4 while the internal reflux ratio may be about 4 to about 6, preferably 5.

Surprising as it may seem, acetone with a normal boiling point of more than 20° below the normal boiling point of acrylonitrile is sufficiently reduced in volatility by the process of this invention as to be largely removed from the bottom of the column along with the higher boilers e. g. acetonitrile, propionitrile, and isopropanol. The product recovered after one pass through the column is every bit as pure as commercially available acrylonitrile and is eminently satisfactory for polymerization. Furthermore the acrylonitrile loss in waste discharge from the bottom is negligible being of the order of 2 to 20 parts per million in the waste under good operating conditions or about 0.01 to 0.1% of the crude acrylonitrile feed. The process is simple to operate and control, and the cost of recovery is reasonable and consistent with the value of the product.

Any departure from the above description which conforms to the present invention is intended to be included within the scope of the claims.

We claim:

1. A process for the purification of acrylonitrile containing low boiling and water-miscible impurities which comprises feeding impure acrylonitrile into a fractionating column having at least 50 plates; introducing sufficient water into said column near the top plate to provide at least 95 mol per cent of water on most of the plates of said column; heating the said acrylonitrile and said water; condensing the resultant aqueous acrylonitrile issuing from the top of said column to form a layer of acrylonitrile above a layer of water; decanting the acrylonitrile from the condensate; and removing water and substantially all of said impurities from the bottom of said column.

2. A process in accordance with claim 1 wherein the layer of water remaining after decanting the acrylonitrile is returned to the column.

3. A process in accordance with claim 1 wherein the said impure acrylonitrile is fed into the column about ⅝ to about ⅞ the way from the bottom to the top of said column.

4. A process in accordance with claim 1 wherein said heating is accomplished by introducing steam into the column at the bottom.

5. A process in accordance with claim 1 wherein said column has from 60 to 90 plates.

6. A process in accordance with claim 5 wherein said column has about 70 plates.

7. A process in accordance with claim 1 wherein the mol percentage of water is about 95 to 98 mol per cent.

8. A process in accordance with claim 7 wherein the mol percentage of water is from 96 to 97.5 mol per cent.

9. A process for the purification of acrylonitrile containing low boiling and water-miscible impurities which comprises feeding impure acrylonitrile into a heated fractionating column having at least 50 plates, said feeding being about ⅝ to ⅞ of the distance from the bottom to the top of said column, the rate of feed of said impure acrylonitrile being in the range of from 3.4% to 1.2% of the rate of water feed into said column, said water feed into the column being near the top plate to provide a water concentration within the column of from 95 to 98 mol per cent; passing the resultant vaporized acrylonitrile to a condenser for condensation; and removing water and substantially all of said impurities from the bottom of said column.

10. A process in accordance with claim 9 wherein the column has about 70 plates and the ratio of external organic reflux to impure acrylonitrile feed is about 4.4.

11. A process in accordance with claim 9 wherein the internal reflux ratio is about 5.

12. A process for the purification of acrylonitrile containing low boiling and water-miscible impurities which comprises feeding impure acrylonitrile into a fractionating column having about 50 plates; introducing sufficient water into said column near the top plate to provide about 95 mol per cent of water on most of the plates of said column; heating said acrylonitrile and said water; passing the resultant vapors containing acrylonitrile to a condenser for condensation; and removing water and substantially all of said impurities from the bottom of said column.

References Cited in the file of this patent

UNITED STATES PATENTS

| Number | Name | Date |
|---|---|---|
| 2,404,163 | Carpenter et al. | July 16, 1946 |
| 2,415,662 | Teter et al. | Feb. 11, 1947 |
| 2,417,635 | Davis | Mar. 18, 1947 |
| 2,444,589 | Blann | July 6, 1948 |
| 2,551,593 | Gilliland et al. | May 8, 1951 |
| 2,555,798 | Kropa | June 5, 1951 |